(12) United States Patent
Dueck et al.

(10) Patent No.: US 9,996,870 B2
(45) Date of Patent: Jun. 12, 2018

(54) METHOD, SYSTEM, AND COMPUTER READABLE MEDIUM FOR UTILIZING JOB CONTROL ORDERS IN AN ORDER MANAGEMENT SYSTEM

(71) Applicant: Oracle International Corporation, Redwood Shores, CA (US)

(72) Inventors: Brian Dueck, Collingwood (CA); Sandra Rolanda Leung, Toronto (CA); Xuan Ju, Richmond Hill (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 521 days.

(21) Appl. No.: 14/530,172

(22) Filed: Oct. 31, 2014

(65) Prior Publication Data
US 2016/0125510 A1    May 5, 2016

(51) Int. Cl.
*G06Q 30/06* (2012.01)
*G06Q 10/06* (2012.01)

(52) U.S. Cl.
CPC ... *G06Q 30/0635* (2013.01); *G06Q 10/06316* (2013.01)

(58) Field of Classification Search
None
See application file for complete search history.

(56) References Cited

U.S. PATENT DOCUMENTS

| | | | |
|---|---|---|---|
| 7,096,189 B1* | 8/2006 | Srinivasan | G06Q 10/06315 705/7.25 |
| 8,024,707 B2* | 9/2011 | Manglik | G06F 11/366 714/38.1 |
| 9,715,675 B2* | 7/2017 | Chakravarty | G06Q 10/06 |
| 2012/0150582 A1 | 6/2012 | Dueck | |
| 2013/0085587 A1 | 4/2013 | Gentile | |
| 2013/0226866 A1* | 8/2013 | Sebastian | G06Q 30/06 707/609 |
| 2016/0232595 A1 | 8/2016 | Corlett et al. | |

OTHER PUBLICATIONS

Oracle, Oracle Communications Order and Service Management, Mar. 2013, https://docs.oracle.com/cd/E35413_01/doc.722/e35415.pdf.*
Oracle, Oracle Application Integration Architecture, May 2012, https://docs.oracle.com/cd/E24010_01/doc.111/e22651.pdf.*
Oracle, Oracle Communications Order and Service Management, Mar. 2013, https://docs.oracle.com/cd/E35413_01/doc.722/e35415.pdf (Year: 2013).*

(Continued)

*Primary Examiner* — Matthew S Gart
*Assistant Examiner* — Akosua Kyereme-Tuah
(74) *Attorney, Agent, or Firm* — Jenkins, Wilson, Taylor & Hunt, P.A.

(57) ABSTRACT

According to one aspect, the disclosed subject matter describes herein a method that includes detecting a fallout condition associated with a communication of orders directed to a network target in an order and service management (OSM) system, identifying a plurality of failed orders corresponding to the fallout condition, and generating a job control order that designates a remedial operation to be applied to each of the plurality of failed orders.

20 Claims, 4 Drawing Sheets

(56) References Cited

OTHER PUBLICATIONS

Oracle, Oracle Application Integration Architecture, May 2012, https://docs.oracle.com/cd/E24010_01/doc.111/e22651.pdf (Year: 2012).*

Commonly-assigned, co-pending U.S. Appl. No. 14/619,906 for "Methods, Systems, and Computer Readable Media for Processing an Order With a Start-Start Dependency," (Unpublished, filed Feb. 11, 2015).

"Oracle® Communications Order and Service Management Concepts," Release 7.2.2, E35415-02, pp. 1-348 (Mar. 2013).

Non-Final Office Action for U.S. Appl. No. 14/619,906 (dated Jun. 26, 2017)

Examiner-Initiated Interview Summary for U.S. Appl. No. 14/619,906 (dated Oct. 18, 2017).

* cited by examiner

METHOD, SYSTEM, AND COMPUTER READABLE MEDIUM FOR UTILIZING JOB CONTROL ORDERS IN AN ORDER MANAGEMENT SYSTEM

TECHNICAL FIELD

The subject matter described herein relates to the remediation of failed orders being processed in a computerized order management system. More particularly, the subject matter described herein relates to systems, methods, and computer readable media for utilizing job control orders in an order management system.

BACKGROUND

At present, computerized order management systems are being employed in a number of industries to conduct order entry and order fulfillment tasks. As used herein, order entry involves the process of electronically receiving orders and entering the orders into the order management system. More specifically, the entered orders are initially stored as record entities within the order management system for subsequent electronic fulfillment. In many instances, orders can contain data regarding one or more products (e.g., goods and/or services), pricing of the one or more products, and one or more offers related to the one or more products. Likewise, order fulfillment is the process of electronically fulfilling the orders after the orders have been entered into the order management system. At times, orders that are being fulfilled may encounter problems in the order management system and experience fallout. Notably, orders experiencing fallout are unintentionally stuck and are facing circumstances that prevent the orders from being further processed. In such scenarios, certain remedial measures can be taken by a system administrator to resolve the situation, such as manually canceling and resubmitting the order or identifying and manually correcting (e.g., undo) the cause of the fault. However, such manual intervention can be cost-prohibitive and significantly inefficient.

Accordingly, there exists a need for systems, methods, and computer readable media for utilizing job control orders in an order management system.

SUMMARY

Methods, systems, and computer readable media for utilizing job control orders in an order management system are disclosed. According to one aspect, the subject matter described herein comprises a method that includes detecting a fallout condition associated with a communication of orders directed to a network target in an order and service management (OSM) system, identifying a plurality of failed orders corresponding to the fallout condition, and generating a job control order that designates a remedial operation to be applied to each of the plurality of failed orders.

The subject matter described herein may be implemented in hardware, software, firmware, or any combination thereof. As such, the terms "function", "node" or "module" as used herein refer to hardware, software and/or firmware components for implementing the feature(s) being described. In one exemplary implementation, the subject matter described herein may be implemented using a non-transitory computer readable medium having stored thereon computer executable instructions that when executed by the processor of a computer cause the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for utilizing job control orders in an order management system. In some embodiments, the disclosed subject matter affords a solution that permits an order management system the ability to apply and manage a set of actions (e.g., remedial operations) with respect to a collection of failed orders. Specifically, the present subject matter enables failed orders processed in an order management system to be remedied en masse after a common fallout condition or cause is identified. For example, a host server in the order management system may be configured to generate a job control order (JCO) that contains data identifying all failed orders to be remedied as well as specifying the remedial operation to be applied to the identified failed orders. Notably, the disclosed subject matter effectively leverages the existing infrastructure and protocols of the order management system (i.e., a JCO is created by the order management system via the same mechanism and manner as any other order) to resolve failed orders, thereby precluding the need to establish a separate remediation system that is apt to experience incompatibility and inefficiency issues.

Reference will now be made in detail to exemplary embodiments of the presently disclosed subject matter, examples of which are illustrated in the accompanying drawings. Wherever possible, the same reference numbers will be used throughout the drawings to refer to the same or like parts. Various embodiments of the present subject matter are disclosed and described herein.

Figure 1:
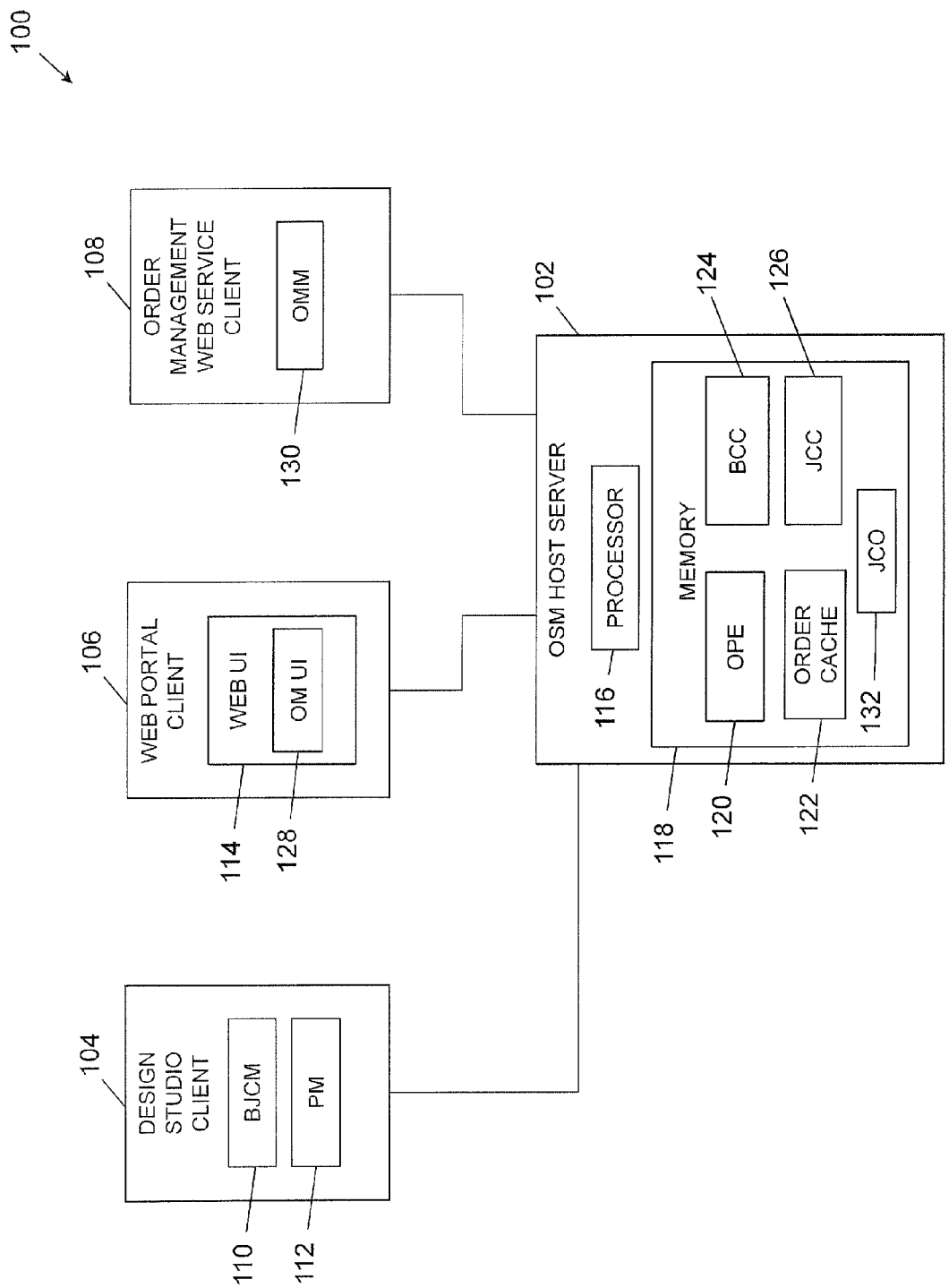
FIG. 1 is a block diagram illustrating a system for utilizing job control orders in an order management system according to an embodiment of the subject matter described herein.

FIG. 1 is a block diagram illustrating an exemplary architecture for an order management system 100 according to an embodiment of the subject matter described herein. Referring to FIG. 1, order management system 100 can include an OSM host server 102 that is communicatively connected to each of a design studio client 104, at least one web portal client 106, and an order management web service client 108. Notably, each of OSM host server 102 and clients 104-108 may comprise a special purpose computer device or machine that includes hardware components (e.g., one or more processor units, memory, and network interfaces) configured to execute software elements (e.g., applications, cartridges, modules, etc.) for the purposes of performing the disclosed subject matter. In addition, it should be noted that OSM host server 102 and its components and functionality described herein constitute a special purpose computer that improves the technological field pertaining to order management systems by providing a unique mechanism for both identifying submitted orders experiencing fallout conditions and remediating the identified problematic orders in a collective manner.

In some embodiments, design studio client 104 includes an OSM client machine that is provisioned with a batch-job control (BJC) module 110 and a provisioning module 112. In particular, design studio client 104 may be configured to utilize BJC module 110 as a design time tool to generate various software based cartridges that are compatible with an OSM host server (e.g., see batch control cartridge 124 and job control cartridge 126 provisioned on OSM host server 102). As used herein, a cartridge generated by design studio client 104 may include any software package, application, or module that is executable by a host server and contains configuration data that defines various policies (e.g., remedial operations and rules) for managing orders (e.g., job orders). Notably, the configuration data and associated metadata enables a recipient host server, such as OSM host server 102, to process, manage, and execute orders and job control orders in accordance to the defined policies. In some embodiments, BJC module 110 may be configured to create either i) a batch control cartridge (BCC) that functions as a controller for batch member orders (BMOs) received by OSM host server 102 or ii) a job control cartridge (JCC) that facilitates the execution of remedial operations (e.g., Suspend, Resume, Update, Fail, Retry Failure, Resolve, Abort, Cancel, etc.) on orders or batch member orders processed by OSM host server 102. After generating a cartridge, design studio client 104 may be further configured to utilize provisioning module 112 to send the generated BCC or JCC to OSM host server 102 for provisioning.

As indicated above, order management system 100 may include OSM host server 102, which is communicatively connected (e.g., via a local network or the Internet) to each of OSM clients 104-108. In some embodiments, OSM host server 102 may include a processor 116 (which may be operatively coupled to a bus) for processing information and executing instructions or operations. Processor 116 may be any type of processor, such as a central processor unit (CPU), a microprocessor, a multi-core processor, and the like. OSM host server 102 further includes a memory 118 for storing information and instructions to be executed by processor 116. In some embodiments, memory 118 can comprise one or more of random access memory (RAM), read only memory (ROM), static storage such as a magnetic or optical disk, or any other type of machine or non-transitory computer-readable medium. OSM host server 102 may further include a communication device (not shown), such as a network interface card or other communications interface, configured to provide communications access to clients 104-108. In some embodiments, memory 118 may be utilized to store an order processing engine 120, order cache 122, a batch control cartridge (BCC) 124, a job control cartridge (JCC) 126, and at least one job control order (JCO) 132. Order processing engine 120 is configured to process and manage several heterogeneous types of orders (i.e., different types of orders). In particular, order processing engine 120 may comprise a software algorithm (executable by one or more processors) that is configured to receive and process batch orders and job control orders in a manner described in detail below.

In some embodiments, OSM host server 102 may receive a number of orders submitted from a client entity, either directly from the client entity or via an order capture system (not shown). For example, the received orders may comprise one or more batch orders (e.g., a group of similar orders identified by a common batch identifier, or "BatchID") that identify one or more products and/or services (e.g., telecommunications services, network services, wireless communications services, etc.) requested by the client entity. In some embodiments, the order capture system may comprise a computer system configured to receive batch orders submitted by requesting client entities and to subsequently forward the orders to OSM host server 102 for processing. For example, OSM host server 102 may be configured to utilize order processing engine 120 to process the received batched orders. In some embodiments, OSM host server 102 may initially store the received orders in a data storage unit, such as a database (not shown). Afterwards, OSM host server 102 may employ order processing engine 120 to access the data storage unit to retrieve and store the batch orders in local memory 118 (e.g., order cache 122). The orders contained in order cache 122 may then be processed by order processing engine 120 in accordance to the rules and policies set forth in BCC 124. In some embodiments, order cache 122 may contain any type of inbound and/or outbound order including, but not limited to customer orders, provisioning orders, billing orders, and inventory orders. Order cache 122 may also include central order management orders (i.e., COM orders) and service order management orders (i.e., SOM orders) managed and processed by OSM host server 102.

In some instances, the orders and/or batch orders processed by OSM host server 102 may experience a fallout condition associated with a communication of orders directed to a network target (not shown). Notably, the fallout condition may be identified or detected by i) a system administrator using web portal client 106 or ii) an order management web service client 108. For example, OSM host server 102 may be configured to provide one or more query capabilities that enable a user to search for "orders with failures" as well as enabling user-defined queries to search for specific failure criteria. In some embodiments, search capabilities are available through web UI 114 and/or order management web service client 108. Upon detecting the fallout condition, the system administrator may utilize web UI 114 on web portal client 106 to initiate the creation of a job control order (JCO). Similarly, order management web service client 108 may initiate the generation of a JCO upon detecting the fallout condition. For example, the creation of JCO may be requested by order management web service client 108 in order to suspend the batch member orders in a batch when an excessive number of order failures are detected. As used herein, a JCO comprises a particular type of order that is configured to manage the execution of remedial operations on other orders (e.g., batch orders) or entities within those orders. In some embodiments, a JCO specifies one or more operations to be carried out on a collection of orders or a collection of entities (e.g., tasks, network actions, or technical actions) within an order. Further, a request for a JCO (e.g., a CreateOrder operation) may be recognized by OSM host server 102 as the same order request for any other OSM order type. Ultimately, the JCO request is managed and processed by OSM host server 102 just as any other order request.

In one example, web portal client 106 may be configured to host a web user interface (UI) 114 that is useable by a system administrator to monitor and manage orders processed in OSM system 100. Specifically, web UI 114 may include an order management UI 116 that enables a system administrator to manage fallout scenarios by manually creating one or more JCOs. In some embodiments, web UI 114 can be configured to assign remedial operations to a plurality of selected orders via the generation of a JCO request (e.g., such as a CreateOrder operation). Similarly, web UI 114 can also be used to monitor and manage any job control order created by web portal client 106 or any other entity (e.g., order management web service client 108).

Likewise, order management web service client 108 may be configured to create JCO requests in an automatic manner. For example, order management web service client 108 may include an order management module 130 that is configured to automatically generate JCO requests (e.g., CreateOrder operations) using preprogrammed logic. For example, order management module 130 may contain logic that triggers the generation of a JCO requests upon the detection of predefined conditions in OSM system 100. In some embodiments, order management module 130 may also be configured to utilize one or more application programming interfaces (APIs) to create and deliver a JCO request (or any other order type) to OSM host server 102.

Regardless of the specific OSM entity (e.g., web portal client 106 and/or order management web service client 108) that is responsible for detecting the fallout condition and/or generating the JCO request to be provided to OSM host server 102, the steps taken to conduct the JCO request creation and submission are largely the same. Notably, the OSM entity may utilize a "CreateOrder" command operation that is configured with specific data that specifies that the order being created is a JCO (e.g., as opposed to a typical order, which is also created via the CreateOrder command).

In some embodiments, OSM host server 102 may receive the JCO request from either web portal client 106 or order management web service client 108. Afterwards, OSM host server 102 may subsequently utilize JCC 126 to process the received JCO request in order to generate a JCO (e.g., JCO 132). Specifically, OSM host server 102 may be configured to parse the payload of JCO request (e.g., CreateOrder command) to access various data fields containing information regarding the identified failed orders and the remedial operation(s) to be applied to said failed orders. Once this information is obtained, OSM host server 102 may utilize configuration data in JCC 126 to construct a JCO that is compatible and recognizable to order processing engine 120.

Figure 2:
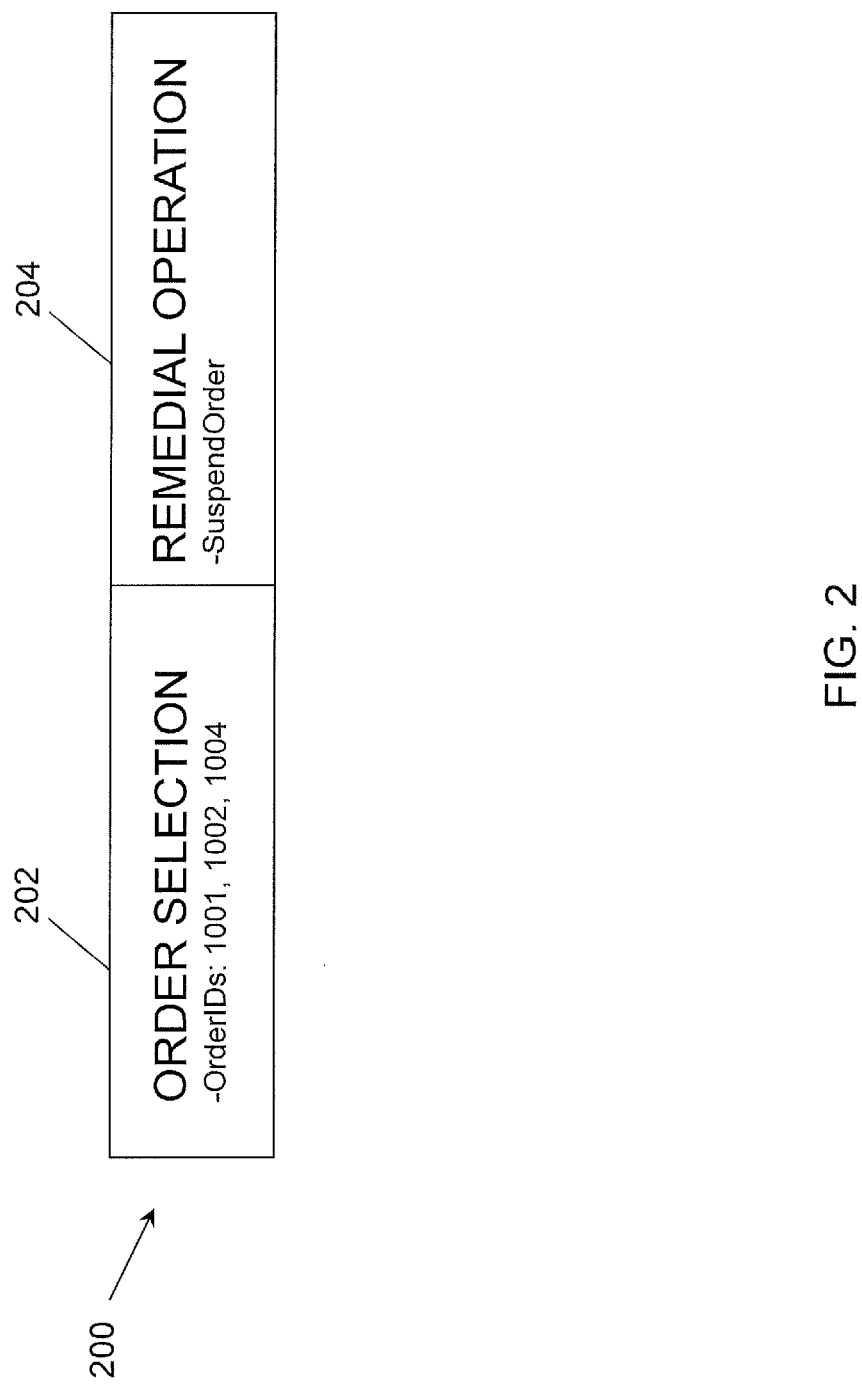
FIG. 2 is a block diagram illustrating an exemplary job control order according to an embodiment of the subject matter described herein.

An abstraction of an exemplary JCO is depicted in FIG. 2. More specifically, FIG. 2 depicts a JCO 200 (which is not unlike JCO 132 in FIG. 1) that comprises a first field 202 and a second field 204. In some embodiments, first field 202 comprises an "Order Selection" field that is configured to contain at least one identifier that indicates the order(s) that require a remedial operation. As depicted in FIG. 2, first field 202 contains a list of individual order identifiers/numbers that have been identified as failed orders that need to be fixed. Notably, these order identifiers were included in the original JCO request. In other embodiments, first field 202 may contain an identifier comprising a batch identifier (i.e., a BatchID) that identifies a group or batch of orders. In some embodiments, a BatchID key may include a data field in the order data (e.g., /_root/batchID) that may be defined as a flexible order header such that the BatchID can be used for searching via the Web UI 116 or via a FindOrder operation utilized order management web service client 108. Similarly, first field 202 may include other search criteria provided by a system administrator (e.g., via Web UI 114) or order management web service client 108. For example, order management web service client 108 may utilize a search feature (e.g., a FindOrder operation) to query orders processed by OSM host server 102, such as batch orders in order cache 122. Exemplary search criteria may comprise customer name information, order priority information, date of order creation, the processing state of the order, and the like. In some embodiments, the search criteria may be incorporated in a SelectBy clause operation that is included in first field 202.

As depicted in FIG. 2, JCO 200 includes a second field 204 that comprises a "Remedial operation" field that is configured to contain an indication of the remedial operation or action to be applied to the orders identified in first field 202. Notably, the specified remedial operation was included in the original JCO request. As an example, second field 204 in JCO 200 includes a SuspendOrder operation. Accordingly, JCO 200 may serve as an instruction to a receiving OSM host server 102 to suspend all computing and processing as related to each of currently processed order 1001, order 1002, and order 1004. In alternate embodiments, second field 204 in JCO 200 may contain other remedial operations such as a suspend order operation, resume order operation, update order operation, fail order operation, retry failure order operation, abort order operation, cancel order operation, and the like.

Returning to FIG. 1, once JCO 132 is created by OSM host server 102, JCO 132 is provided to order processing engine 120 for execution. For example, order processing engine 120 may parse the received JCO to access the order selection information (e.g., order identifiers contained in field 202 in FIG. 2) for purposes of identifying the relevant failed orders. Using the identities of failed orders specified in the JCO, OSM host server 102 may be configured to search orders in order cache 122 for the aforementioned failed orders. In some embodiments, order processing engine 120 may be configured to utilize the information contained in the JCO along with JCC 126 as a means to search orders in order cache 122 to locate the designated failed orders. Similarly, in the case of selection criteria utilization, order processing engine 120 may also be configured to use JCC 126 to locate the orders in order cache 122 that include order identifiers that match the search criteria indicated in the JCO. Likewise, in the scenario where a BatchID is included in a received JCO, order processing engine 120 may be configured to use JCC 126 to find the orders in order cache 122 that include order identifiers associated with the BatchID key.

After locating the failed orders, OSM host server 102 may be configured to apply the remedial operations specified in JCO 132. Notably, the manner of execution associated with the remedial operation(s) indicated in JCO 132 is specified in JCC 126. In some embodiments, order processing engine 120 may parse the JCO to obtain the indicated operation information (e.g., operation indicated in field 204 in FIG. 2) in order to employ the designated remedial operation(s) on the identified failed orders. For example OSM host server 102 may be configured to cancel, suspend, resume, retry, resolve, and/or terminate the identified failed orders per the operation designated in JCO 132. More specifically, order processing engine 120 applies the aforementioned remedial operation(s) to the failed orders identified in the processed JCO in accordance to the protocols and rules set forth by the configuration data and metadata contained in JCC 126.

In some embodiments, order processing engine 120 may utilize JCC 126 to group the identified failed orders as per a degree of parallelism such that the remedial operations may be performed in parallel on the failed orders by order processing engine 120. For example, each remedial operation executed by order processing engine 120 may constitute a transaction. Notably, each transaction will record the remedial operation performed, the response received, and the status of the transaction for that specific order identifier. As each group of failed orders is processed by order processing engine 120, counters may be updated to reflect a tallied count of successful transactions, failed transactions, and/or pending transactions. In the event all of the transactions are completed (e.g., remedial operations are executed against the order identifiers that belong to the JCO), the order completes (e.g., a final completion stage with no further processing activities).

Figure 3:
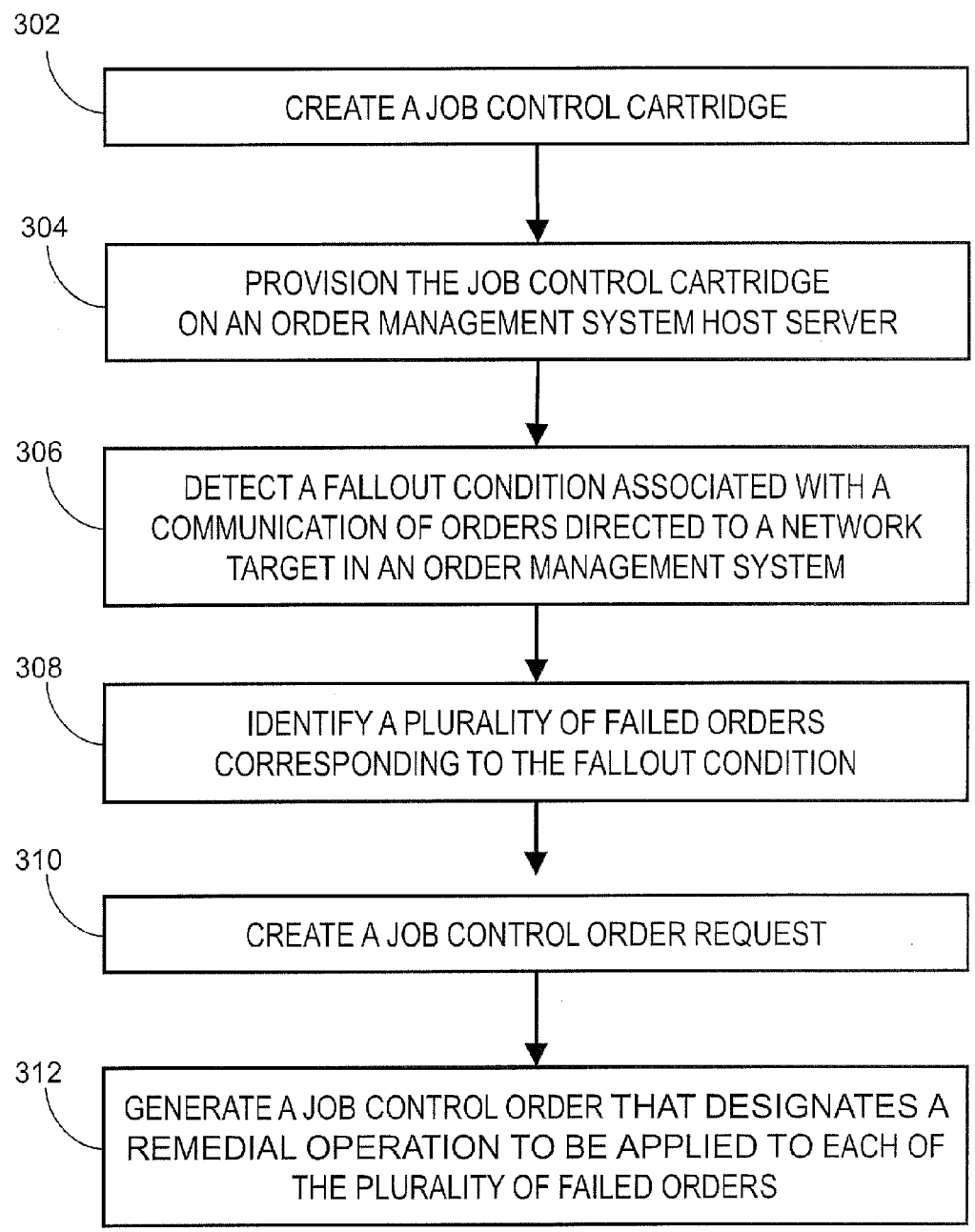
FIG. 3 is a flow chart illustrating an exemplary process for utilizing job control orders in an order management system according to an embodiment of the subject matter described herein.

FIG. 3 illustrates a method 300 for utilizing job control orders in an order management system in accordance with embodiments of the subject matter described herein. The following method is also described with respect to system 100 in FIG. 1 as an exemplary embodiment.

In step 302, a job control cartridge is created. In some embodiments, design studio client 104 may utilize BJC module 110 to design and generate a job control cartridge. As indicated above, a job control cartridge may comprise a software construct that contains policies and rules that may be used (e.g., upon being provisioned on an OSM host server) to manage and process job control orders.

In step 304, the job control cartridge is provisioned to an OSM host server. In some embodiments, design studio client 104 may be configured to utilize a provisioning module 112 to send the created job control cartridge to OSM host server 102. Upon receipt, OSM host server 102 may load the job control cartridge in local memory 118 for later execution by processor 116 and order processing engine 120.

In step 306, a fallout condition associated with a communication of orders directed to a network target in the order management system is detected. In some embodiments, a system administrator and/or order management web service client 108 may detect that a communication of orders directed to a particular network target is experiencing a fallout condition.

In step 308, a plurality of failed orders corresponding to the fallout condition is identified. In some embodiments, order management web service client 108 and/or a system administrator utilizing Web UI 114 may identify the failed orders that are associated with and/or contributing to the fallout condition. These failed orders may be identified and/or indicated via a number of approaches. For example, the failed orders may be i) individually identified using an order identifier/number unique to the individual order, ii) identified as members of a group or batch using a batch identifier, and iii) identified as a returned result of specific search criteria provided by the system administrator and/or order management web service client 108.

In step 310, a job control order request is generated. In some embodiments, order management web service client 108 and/or a system administrator utilizing Web UI 114 may generate a JCO request (e.g., a CreateOrder command) that both identifies a number and/or group of failed orders (i.e., as indicated in step 308) and designates a remedial operation to be applied to the identified failed orders. In some embodiments, the JCO request may ultimately be sent to OSM host server 102.

In step 312, a job control order that designates a remedial operation to be applied to each of the plurality of failed orders is generated. In some embodiments, OSM host server 102 receives the JCO request and subsequently generates the JCO. For example, OSM host server 102 may parse the JCO request to access the failed order identification information and the remedial operation information, which is then included in a newly created JCO. OSM host server 102 may then submit the JCO to order processing engine 120 for processing. For example, order processing engine 120 may use the information contained in the received JCO and the corresponding configuration data in JCC 126 to remedy the identified failed orders.

It will also be appreciated that exemplary method 300 is for illustrative purposes and that different and/or additional actions may be used. It will also be appreciated that various actions described herein may occur in a different order or sequence.

Figure 4:
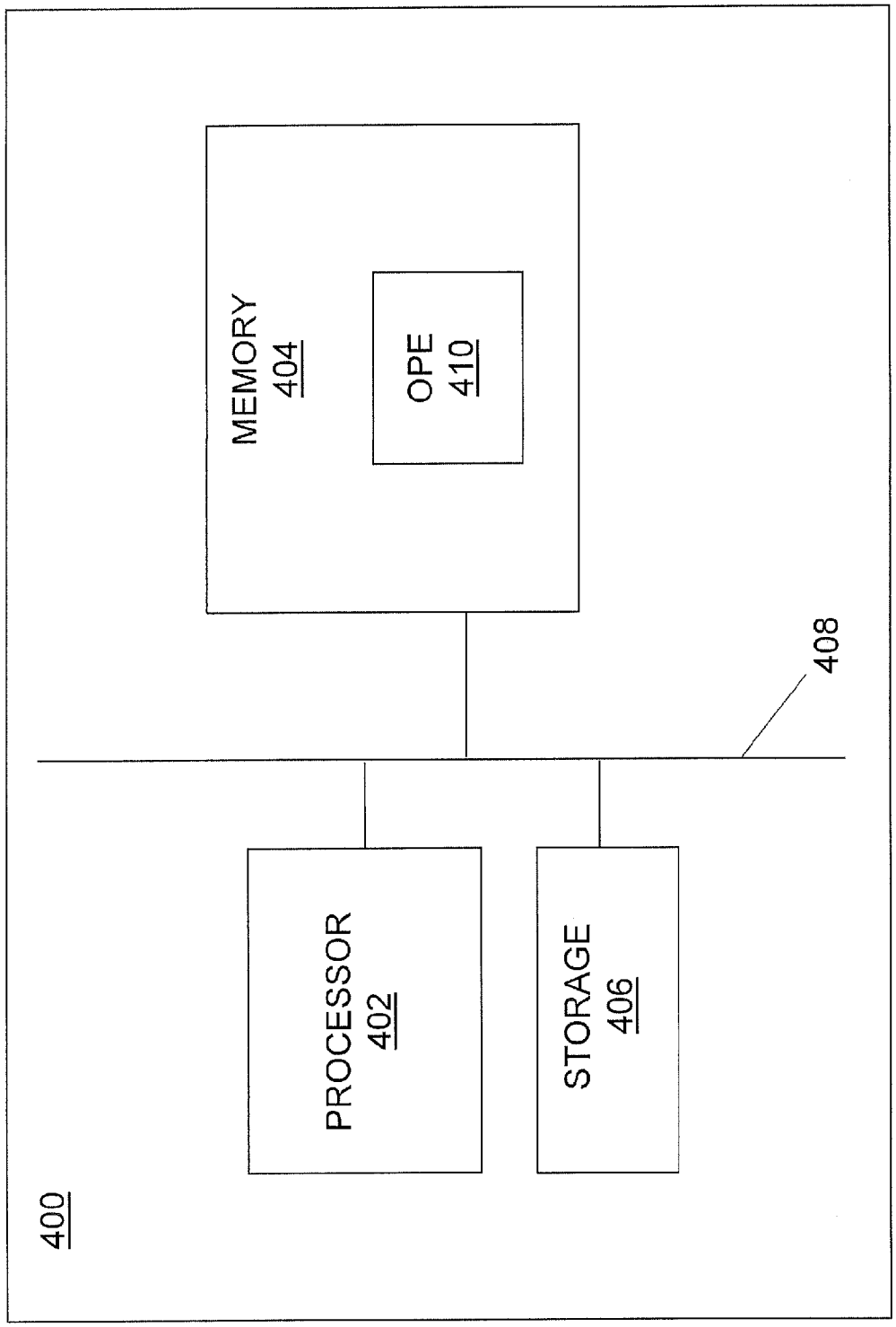
FIG. 4 is a block diagram of a computer system suitable for use in performing the functions described herein.

FIG. 4 depicts a high level block diagram of a computer system suitable for use in performing the functions described herein. As depicted in FIG. 4, system 400 comprises a processor 402, a memory 404, a storage device 406, and communicatively connected via a system bus 408. In some embodiments, processor 402 can comprise can comprise a microprocessor, central processing unit (CPU), or any other like hardware based processing unit. In some embodiments, an order processing engine (OPE) 410 can be stored in memory 404, which can comprise random access memory (RAM), read only memory (ROM), optical read/write memory, cache memory, magnetic read/write memory, flash memory, or any other non-transitory computer readable medium. In some embodiments, processor 402 and memory 404 can be used to execute and manage the operation of OPE 410, which in turn is configured to process orders of all types (e.g., JCO 132 in FIG. 1). In some embodiments, storage device 406 can comprise any storage medium or storage unit that is configured to store data accessible by processor 402 via system bus 408. Exemplary storage devices can comprise one or more local databases hosted by system 400. System 400 may also include a network interface (not shown) for communicating with other computers over a network.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for utilizing job control orders in an order management system, the method comprising:

detecting a fallout condition associated with a communication of orders directed to a network target in an order and service management (OSM) system;

identifying a plurality of failed orders corresponding to the fallout condition;

receiving, by an order and service management (OSM) host server, a job control order request that includes a payload containing data identifying the plurality of failed orders and a remedial operation to be applied to each of the plurality of failed orders; and parsing, by the OSM host server, the payload of the job control order request to access the data identifying the plurality of failed orders and the remedial operation to generate a job control order that designates the remedial operation to be applied to each of the plurality of failed orders, wherein the job control order is an order that identifies the plurality of failed orders and is separate and different from each of the plurality of failed orders;

submitting the job control order to an order processing engine in the OSM host server, wherein the order processing engine uses the data identifying the remedial operation contained in the job control order to perform the remedial operation on the failed orders in parallel.

2. The method of claim 1 wherein the job control order includes a first field containing an identifier indicating the plurality of failed orders and a second field indicating the remedial operation to be applied to each of the plurality of failed orders.

3. The method of claim 2 wherein the identifier in the job control order is statically provisioned using at least one of a batch identifier and a plurality of individual order identifiers.

4. The method of claim 2 wherein the identifier is dynamically provisioned using search criteria input.

5. The method of claim 1 wherein the remedial operation includes at least one of a suspend order operation, a resume order operation, a cancel order operation, a terminate order operation, an update order operation, a resolve order failure operation, a retry order operation, and a fail order operation.

6. The method of claim 1 wherein the job control order is executed by the OSM system in a manner similar to any other order.

7. The method of claim 1 wherein the job control order is created via either a web user interface (UI) of a client machine or an order management web server.

8. The method of claim 1 wherein policies specified by the job control order are included in a job control cartridge that is electronically provisioned to an OSM host server in the OSM system.

9. A system for utilizing job control orders in an order management system, the system comprising:

an OSM client entity configured to detect a fallout condition associated with a communication of orders directed to a network target in an order and service management (OSM) system and to identify a plurality of failed orders corresponding to the fallout condition; and an order and service management (OSM) host server configured to receive, from the OSM client entity, a job control order request that includes a payload containing data that identifies the plurality of failed orders and a remedial operation to be applied to each of the plurality of failed orders, to parse the payload of the job control order request to access the data identifying the plurality of failed orders and the remedial operation to generate a job control order that designates the remedial operation to be applied to each of the plurality of failed orders, and to submit the job control order to an order processing engine in the OSM host server, wherein the order processing engine uses the data identifying the remedial operation contained in the job control order to perform the remedial operation on the failed orders in parallel, wherein the job control order is an order that identifies the plurality of failed orders and is separate and different from each of the plurality of failed orders.

10. The system of claim 9 wherein the job control order includes a first field containing an identifier indicating the plurality of failed orders and a second field indicating the remedial operation to be applied to each of the plurality of failed orders.

11. The system of claim 10 wherein the identifier in the job control order is statically provisioned using at least one of a batch identifier and a plurality of individual order identifiers.

12. The system of claim 10 wherein the identifier is dynamically provisioned using search criteria input.

13. The system of claim 9 wherein the remedial operation includes at least one of a suspend order operation, a resume order operation, a cancel order operation, a terminate order operation, an update order operation, a resolve order failure operation, a retry order operation, and a fail order operation.

14. The system of claim 9 wherein the job control order is executed by the OSM system in a manner similar to any other order.

15. The system of claim 9 wherein the job control order is created via either a web user interface (UI) of a client machine or an order management web server.

16. The system of claim 9 wherein policies specified by the job control order are included in a job control cartridge that is electronically provisioned to an OSM host server in the OSM system.

17. A non-transitory computer readable medium having stored thereon executable instructions that when executed by the processor of a computer cause the computer to perform steps comprising:

detecting a fallout condition associated with a communication of orders directed to a network target in an order and service management (OSM) system;

identifying a plurality of failed orders corresponding to the fallout condition;

receiving, by an order and service management (OSM) host server, a job control order request that includes a payload containing data identifying the plurality of failed orders and a remedial operation to be applied to each of the plurality of failed orders;

parsing, by the OSM host server, the payload of the job control order request to access the data identifying the plurality of failed orders and the remedial operation to generate a job control order that designates the remedial operation to be applied to each of the plurality of failed orders, wherein the job control order is an order that identifies the plurality of failed orders and is separate and different from each of the plurality of failed orders; and submitting the job control order to an order processing engine in the OSM host server, wherein the order processing engine uses the data identifying the remedial operation contained in the job control order to perform the remedial operation on the failed orders in parallel.

18. The computer readable medium of claim 17 wherein the job control order includes a first field containing an identifier indicating the plurality of failed orders and a second field indicating the remedial operation to be applied to each of the plurality of failed orders.

19. The computer readable medium of claim 17 wherein the job control order is created via either a web user interface (UI) of a client machine or an order management web server.

20. The computer readable medium of claim 17 wherein policies specified by the job control order are included in a job control cartridge that is electronically provisioned to an OSM host server in the OSM system.

* * * * *